(12) United States Patent
Emens et al.

(10) Patent No.: US 6,463,343 B1
(45) Date of Patent: Oct. 8, 2002

(54) SYSTEM AND METHOD FOR CONTROLLING REMOTE DEVICES FROM A CLIENT COMPUTER USING DIGITAL IMAGES

(75) Inventors: Michael Lawrence Emens, San Jose; Reiner Kraft, Gilroy; Neelakantan Sundaresan, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/371,739

(22) Filed: Aug. 10, 1999

(51) Int. Cl.$^7$ .............................................. G05B 19/42
(52) U.S. Cl. ............................. 700/83; 700/17; 700/18; 700/19; 700/65; 700/86; 700/87; 709/201; 709/203; 709/217; 709/218; 709/219; 382/115; 382/119; 382/232
(58) Field of Search ............................. 700/17, 18, 19, 700/20, 59, 65, 66, 83, 86, 87, 88; 709/201, 203, 217, 218, 219, 204; 382/115, 119, 232; 707/10, 104.1, 201

(56) References Cited

U.S. PATENT DOCUMENTS

| | | | |
|---|---|---|---|
| 4,982,324 A | | 1/1991 | McConaughy et al. |
| 4,994,788 A | | 2/1991 | Philippe et al. |
| 5,086,385 A | * | 2/1992 | Launey et al. ......... 340/825.37 |
| 5,220,380 A | | 6/1993 | Hirata et al. |
| 5,289,365 A | * | 2/1994 | Caldwell et al. ........... 340/3.71 |
| 5,315,711 A | | 5/1994 | Barone et al. |
| 5,491,743 A | * | 2/1996 | Shiio et al. .................. 345/759 |

(List continued on next page.)

FOREIGN PATENT DOCUMENTS

TW 300368 3/1997

OTHER PUBLICATIONS

IBM Technical Disclosure Bulletin, vol. 38, No. 1, Jan. 1995, "Distributed object Encapsulation of Customer Information Control System Distributed Transaction Processing", pp. 177–180.
IBM Technical Disclosure Bulletin, vol. 38, No. 9, Sep. 1995, "MPEG Menu Manager", pp. 291–295.
(Abstract—1pp) T. Lumpp, G. Gruhler and W. Kuchlin, "Virtual Java Devices, Integration of Fieldbus Based Systems in the Internet", *IEEE: IE CON '98 Proceedings of the 24$^{th}$ Annual Conference of the IEEE Industrial Electronics Society* (Cat No. 98CH36200), Pt. vol. 1, pp. 176–181 4 vol. 1, published: New York, NY, USA, 1998, vol. xxix+2635 pp.
(Abstract—1pp) J.M. Puckett and L. Burczyk, "Remote Monitoring Using Technologies from the Internet and World Wide Web", *Annual Meeting of the Institute of Nuclear Materials Management (38$^{th}$)*, Phoenix, AZ, USA, Jul. 20–24, 1997. Sponsored by the Department of Energy, Washington, DC.

(List continued on next page.)

*Primary Examiner*—Ramesh Patel
(74) *Attorney, Agent, or Firm*—Gates & Cooper LLP

(57) ABSTRACT

A method, apparatus, and article of manufacture for controlling a remote device from a client computer using a digital image of a remote location associated with the remote device. Using graphical user interface (GUI) provided by a client computer, the user select areas in the digital image for mapping to control functions for the remote device. These control functions are associated with command objects downloaded from a server computer and displayed on the graphical user interface. The control functions for the remote device can then be selected by moving a cursor over the selected areas of the digital image. When a control function is selected, the client computer formulates a request that the server computer and/or remote device can understand. Instantaneous feedback is provided by the digital image for any control functions that may be invoked by the user.

45 Claims, 12 Drawing Sheets

U.S. PATENT DOCUMENTS

| | | | | |
|---|---|---|---|---|
| 5,539,479 A | | 7/1996 | Bertram | |
| 5,550,982 A | * | 8/1996 | Long et al. | 709/330 |
| 5,557,545 A | * | 9/1996 | Loffel et al. | 700/286 |
| 5,602,597 A | | 2/1997 | Bertram | |
| 5,606,374 A | | 2/1997 | Bertram | |
| 5,659,691 A | * | 8/1997 | Durward et al. | 345/727 |
| 5,761,071 A | | 6/1998 | Bernstein et al. | |
| 5,781,550 A | | 7/1998 | Templin et al. | |
| 5,791,992 A | | 8/1998 | Crump et al. | |
| 5,802,518 A | | 9/1998 | Karaev et al. | |
| 5,805,812 A | | 9/1998 | Fish et al. | |
| 5,826,122 A | | 10/1998 | Shekel | |
| 5,838,906 A | | 11/1998 | Doyle et al. | |
| 5,838,910 A | | 11/1998 | Domenikos et al. | |
| 5,870,301 A | | 2/1999 | Yakushiji et al. | |
| 5,898,780 A | | 4/1999 | Liu et al. | |
| 5,898,835 A | | 4/1999 | Truong | |
| 5,911,582 A | | 6/1999 | Redford et al. | |
| 5,930,473 A | * | 7/1999 | Teng et al. | 709/204 |
| 5,930,768 A | | 7/1999 | Hooban | |
| 5,956,665 A | * | 9/1999 | Martinez et al. | 345/764 |
| 5,977,872 A | * | 11/1999 | Guertin | 340/286.13 |
| 6,097,380 A | * | 8/2000 | Crites et al. | 707/500.1 |
| 6,192,282 B1 | * | 2/2001 | Smith et al. | 700/19 |
| 6,298,326 B1 | * | 10/2001 | Feller | 379/75 |
| 6,298,374 B1 | * | 10/2001 | Sasaki et al. | 709/204 |

OTHER PUBLICATIONS

Rajesh Puranik, "Is the Web the Platform?", *Communications News*, vol. 35, Issue 9, Sep. 1998, pp. 74–75.

Goldberg et al., "Beyond the Web: Excavating the Real World Via Mosaic", http://www.usc.edu/dept/raiders/paper/, Oct. 17, 1994, 18 pages.

Goldberg et al., "The Telegarden",. http://telegarden.aec.at/, Jun.1995, 2pp.

Goldberg et al, "About Telegarden", http://telegarden.aec.at/html/intro.html?, Aug. 1995, 3 pages.

* cited by examiner

SYSTEM AND METHOD FOR CONTROLLING REMOTE DEVICES FROM A CLIENT COMPUTER USING DIGITAL IMAGES

CROSS-REFERENCE TO RELATED APPLICATIONS

This application is related to the following co-pending and commonly-assigned U.S. Patent Applications:

Ser. No. 09/298,217, filed on Apr. 23, 1999, by Michael L. Emens, Reiner Kraft, and Neelakantan Sundaresan, entitled "SYSTEM AND METHOD FOR COMPUTER-BASED NOTIFICATIONS OF REAL-WORLD EVENTS USING DIGITAL IMAGES", Ser. No. 09/045,140, filed on Mar. 20, 1998, by Stefan B. Edlund, Matthias Eichstaedt, Donald M. Eigler, and Reiner Kraft, entitled "A SYSTEM AND METHOD FOR OPERATING SCIENTIFIC INSTRUMENTS OVER WIDE AREA NETWORKS", now U.S. Pat. No. 6,085,227, issued on Jul. 4, 2000, both of which applications are incorporated by reference herein.

BACKGROUND OF THE INVENTION

1. Field of the Invention

The present invention generally relates to applications involving the Internet, and in particular, to a system and method for controlling remote devices from a client computer using a digital image.

2. Description of Related Art

Currently, there are Internet-based systems that allow users to remotely interact with and/or operate devices over a wide area network. Consider, for example, co-pending and commonly-assigned patent applications Ser. No. 09/298, 217, filed on Apr. 23, 1999, by Michael L. Emens, Reiner Kraft, and Neelakantan Sundaresan, entitled "SYSTEM AND METHOD FOR COMPUTER-BASED NOTIFICATIONS OF REAL-WORLD EVENTS USING DIGITAL IMAGES", attorney docket No. AM9-99-023, and Ser. No. 09/045,140, filed on Mar. 20, 1998, by Stefan B. Edlund, Matthias Eichstaedt, Donald M. Eigler, and Reiner Kraft, entitled "A SYSTEM AND METHOD FOR OPERATING SCIENTIFIC INSTRUMENTS OVER WIDE AREA NETWORKS", now U.S. pat. No. 6,085,227, issued on Jul. 4, 2000, Attorney Docket No. AM998-036, which application is incorporated by reference herein. These applications describe network-based systems that include client computers for interacting with users to accept commands and display results, and server computers for monitoring and/or operating remote devices on behalf of the users.

Moreover, there are existing systems that let users manage their home using a computer (e.g., home management software). On the other hand, there has been little work done in developing user interfaces for controlling such systems. There is a need in the art for improved user interfaces for controlling remote devices, especially home appliances and the like. The present invention provides a live digital image to the user interface, wherein the user can select areas in this image and map these areas to control functions for the remote devices associated therewith. This mapping function relies on list of command objects that represent the control functions, which are provided by the server computer and displayed on the user interface.

SUMMARY OF THE INVENTION

To overcome the limitations in the prior art described above, and to overcome other limitations that will become apparent upon reading and understanding the present specification, the present invention discloses a method, apparatus, and article of manufacture for controlling a remote device from a client computer using a digital image of a remote location associated with the remote device. Using graphical user interface (GUI) provided by a client computer, the user select areas in the digital image for mapping to control functions for the remote device. These control functions are associated with command objects downloaded from a server computer and displayed on the graphical user interface. The control functions for the remote device can then be selected by moving a cursor over the selected areas of the digital image. When a control function is selected, the client computer formulates a request that the server computer and/or remote device can understand. Instantaneous feedback is provided by the digital image for any control functions that may be invoked by the user.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention provides a system and method for controlling remote devices, such as home appliances, from a client computer using a digital image. This allows, for example, people who are away from their home to remotely control devices in their home, such as a central heater or some home appliances (e.g., oven, microwave, refrigerator, etc.). With the advent of the Internet and the World Wide Web, there are new ways of achieving this in a convenient manner, so that users are able to control such devices from anywhere in the world from a Web browser and client coordinator executed by a client computer.

According to the present invention, a remote device can be selected by moving a cursor over a live digital image of the device displayed by a Web browser and client coordinator, thus providing a very natural user interface. The digital image is captured using one or more cameras positioned at the remote location, wherein the cameras are attached to a server computer. Using the Web browser and client coordinator, the user can select areas from the digital image captured from these cameras using a cursor control device, and then map or otherwise associate these selected areas with command objects associated with the control functions for the remote devices. The command objects are provided from a list that is managed by a server computer. When a control function is invoked, the Web browser and client coordinator formulate a request that is transmitted to the server computer and/or remote device, and the remote device and/or server computer then responds to the request by invoking some action on the part of the remote device. Also, instantaneous feedback is provided using the digital image for any actions that may result from the control functions invoked by the user.

The present invention provides several advantages. First, it provides a live digital image from the remote location. Second, the user is able to control the remote devices using the live digital image. Third, the user receives immediate feedback from any actions resulting from control functions requested of the remote devices.

Hardware and Software Environment

Figure 1:
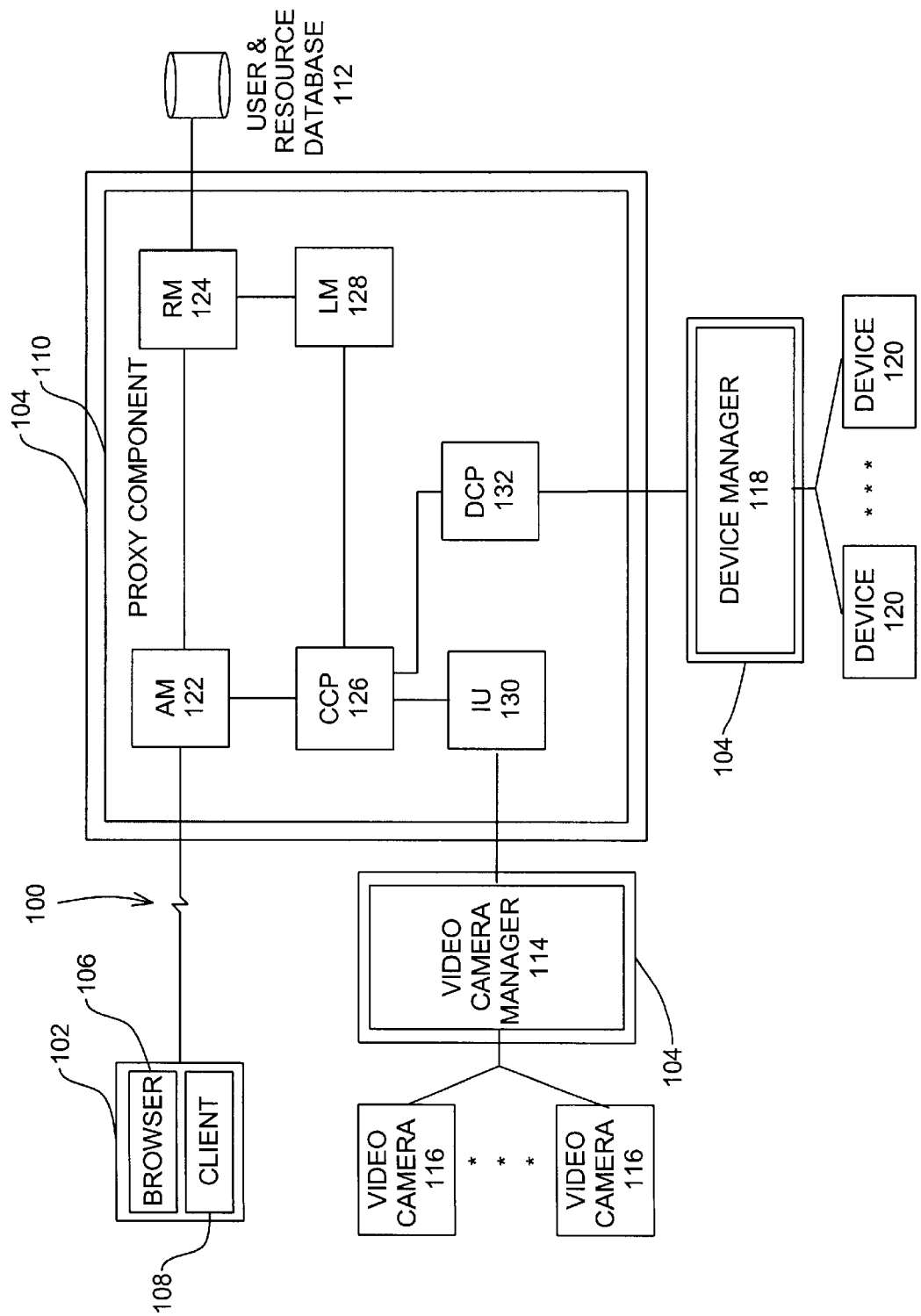
FIG. 1 is an exemplary hardware environment used to implement the preferred embodiment of the present invention.

FIG. 1 schematically illustrates an exemplary hardware and software environment used in the preferred embodiment of the present invention. The present invention is implemented using a network 100 to connect one or more client computers 102 to one or more server computers 104. In this embodiment, one of the server computers 104 comprises a proxy server computer 104 that provides intermediate processing of commands for the remote device 106, and others of the server computers 104 comprise device server computers 104 that control video cameras and other remote devices. A typical combination of resources may include client computers 102 that comprise personal computers or workstations, and server computers 104 that comprise personal computers, workstations, minicomputers, or mainframes. The network 100 connecting these computers may comprise the Internet, a LAN, a WAN, etc.

Generally, the present invention is implemented using one or more computer programs that are executed by the client computers 102 and/or server computers 104. In the exemplary embodiment of FIG. 1, these computer programs include: (1) a Web browser 106 and client coordinator 108 that are executed by the client computers 102; (2) a Proxy Component 110 executed by the proxy server computer 104 that manages a user and resource database 112; (3) a Video Camera Manager 114 executed by a first one of the device server computers 104 for managing video cameras 116; and (4) a Device Manager 118 executed by a second one of the device server computers 104 for managing remote devices 120. The Proxy Component 110 further includes sub-components or modules including an Authentication Manager (AM) 122, Resource Manager (RM) 122, Client Command Processor (CCP) 124, Location Mapper (LM) 126, Image Unit (IU) 128, and Device Command Processor (DCP) 130.

Each of the computer programs comprise instructions which, when read and executed by their respective computers, cause the computers to perform the steps or elements of the present invention. The computer programs are usually embodied in or readable from a device, medium, or carrier, e.g., a local or remote data storage device or memory device coupled to the computer directly or coupled to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more computer programs accessible from any device, medium, or carrier.

Of course, those skilled in the art will recognize that the exemplary environment illustrated in FIG. 1 is not intended to limit the present invention. For example, the functions of the proxy server computer 104 and device server computers 104 could be performed by a single server computer 104. Moreover, a client/server architecture is not required, and the present invention could be completed implemented on a single computer, such as a workstation. Indeed, those skilled in the art will recognize that other alternative environments may be used without departing from the scope of the present invention.

Components of the Preferred Embodiment

The preferred embodiment of the present invention uses a number of novel components in its operations. These components are described in more detail below.

Web Browser and Client Coordinator

The client computer 102 executes a Web browser 106 that is able to run executable content (e.g., Java applets), which preferably comprises a client coordinator 108. These Web browser 106 and client coordinator 108 together provide a graphical user interface (GUI) for the functionality of the present invention. In the preferred embodiment, the graphical user interface displays graphical elements for configuring controls for operating the remote devices 120, for invoking those controls, and for receiving a live digital image showing the status of the remote devices 120. In addition, audio or other multimedia elements could be used to enhance the user's experience.

The client coordinator 108 allows the user to administer and manage user accounts for access control. The system can be used only after successful authentication of the identity. Generally, user management and authentication are well known in the art and existing systems can be easily integrated into the preferred embodiment.

In the preferred embodiment, the user uses the Web browser 106 to access the Web site to download and install the client coordinator 108 as an applet executed within the Web browser 106. The Web browser 106 and client coordinator 108 together allow the user to define resource profiles, identify devices 120, modify device 120 properties, enable and disable operation of devices 120, etc. The Web browser 106 and client coordinator 108 together also allow the user to select different digital images (video camera 116 views). In addition, the Web browser 106 and client coordinator 108 together allow the user to select areas within the digital images, associate devices 120 with the selected areas, and assign controls to the associated devices 120.

Proxy Component

The overall purpose of the Proxy Component 110 is to interact with the Web browser 106 and client coordinator 108, manage the user and resource database 112, and interact with the Video Camera Manager 114 and the Device Manager 118. The Proxy Component 110 is comprised of a number of sub-components, including an Authentication Manager (AM) 122, Resource Manager (RM) 122, Client Command Processor (CCP) 124, Location Mapper (LM) 126, Image Unit (IU) 128, and Device Command Processor (DCP) 130.

The Authentication Manager (AM) 122 sub-component is responsible for authenticating users, granting access to the system, and managing user sessions. After successfully authentication, a user can interact with the system and can make use of the features described herein.

The Resource Manager (RM) 124 sub-component is responsible for managing the user and resource database 112. The Resource Manager (RM) 124 sub-component uses the database 112 to store information about users and resource profiles.

The Client Command Processor (CCP) 126 sub-component is responsible for performing a profile matching function, using input from the client coordinator 108, to determine which devices 120 to operate.

The Location Mapper (LM) 128 sub-component is responsible for identifying the locations of cameras 116 and devices 120 associated with digital images.

The Image Unit (IU) 130 sub-component is responsible for interfacing with the Video Camera Manager 114 to obtain the digital images.

The Device Command Processor (DCP) 132 sub-component is responsible for interfacing with the Device Manager 118 to provide commands and receive responses from the devices 120.

Video Camera Manager

The Video Camera Manager 114 manages one or more video cameras (or digital still cameras) 116. Note that, in the preferred embodiment, the digital image is static in the sense that the camera 116 position does not move, although other embodiments may use moving cameras 116. Therefore, a mapping between a digital image and video camera 116 stored in a resource profile in the database 112 remains valid until either the defined resource profile is changed or the camera 116 is moved. In either case, the user has to manually update the resource profile to reflect the changes.

Device Manager

The Device Manager 118 manages one or more devices 120. The Device Manager 118 forwards user commands from the Device Command Processor 132 to specified devices 120 and returns responses to those commands to the Device Command Processor 132. These commands can be any number of different commands, depending on the repertoire of the device 120 itself It is the user's (or system operator's) responsibility to place the devices 120 in the correct location and to configure them correctly. For example, if the user wants to control a light switch, the user has to set up a device 120 so that it can perform these actions.

Also, the user is responsible for setting up a video camera 116 properly, so that the live digital image is associated with the controlled remote device 120. For example, consider a scenario where the user has two devices 120 in his house, wherein one device 120 is used to control a light switch and another device 120 is used to control shades. If the user associates the two devices 120 with the wrong digital image, or the wrong areas of the digital image, or with the wrong controls, the system may not function correctly.

Operation of the Preferred Embodiment

FIGS. 2A–2J that illustrate an example of the graphical user interface provided by the Web browser 106 and client coordinator 108 according to the preferred embodiment of the present invention. These figures illustrate the operation of the preferred embodiment.

Figure 2A:
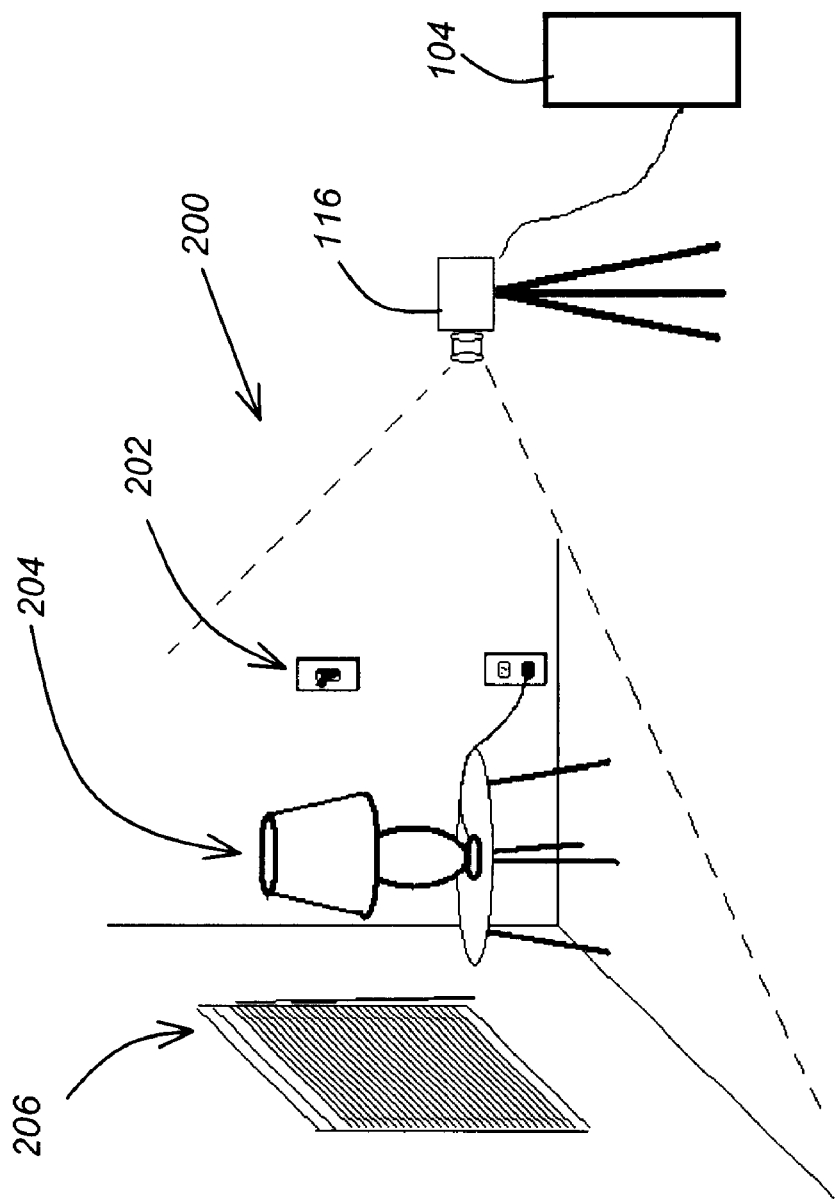
FIGS. 2A–2J are illustrations of a graphical user interface according to the preferred embodiment of the present invention.

FIG. 2A shows an example wherein a video camera 116 is attached to a device server 104. The video camera 116 encompasses a scene 200 in a building, which includes a light switch 202 that operates a lamp 204 and a window with electro-mechanically operated shades 206.

Figure 2B:
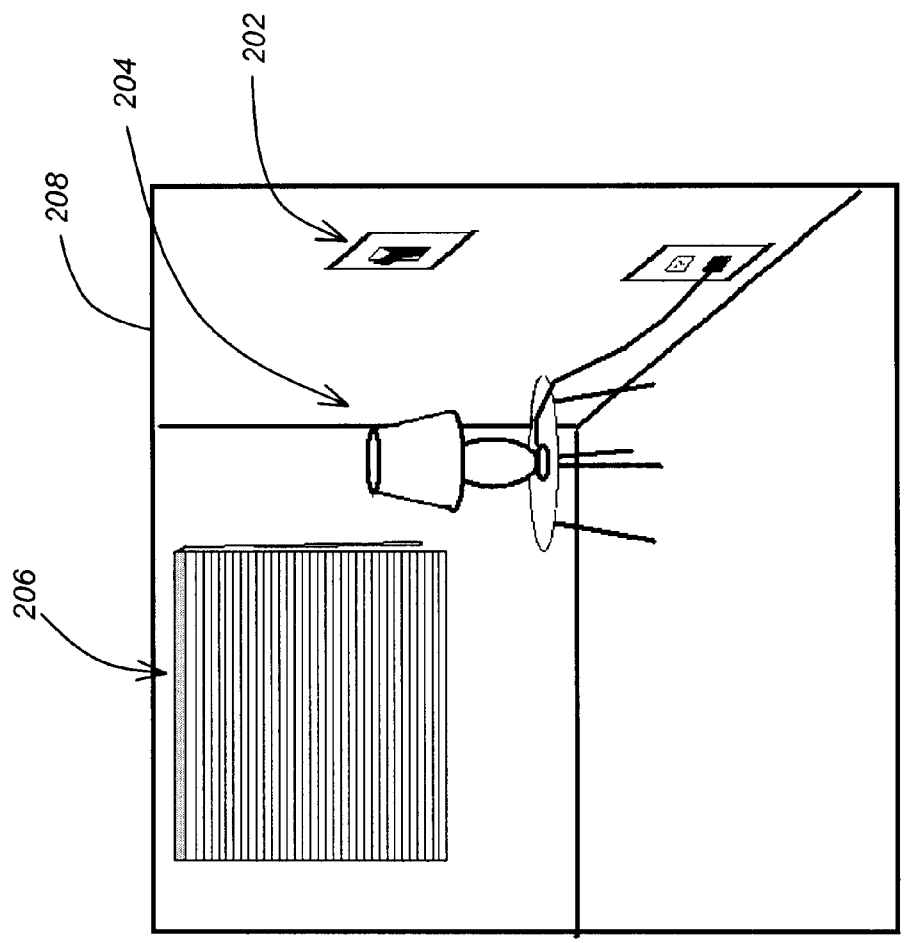

FIG. 2B shows an example of a live digital image 208 generated by the video camera 116 and transmitted to the device server 104. The live digital image 208 shows the light switch 202, the lamp 204, and the window shades 206.

Figure 2C:
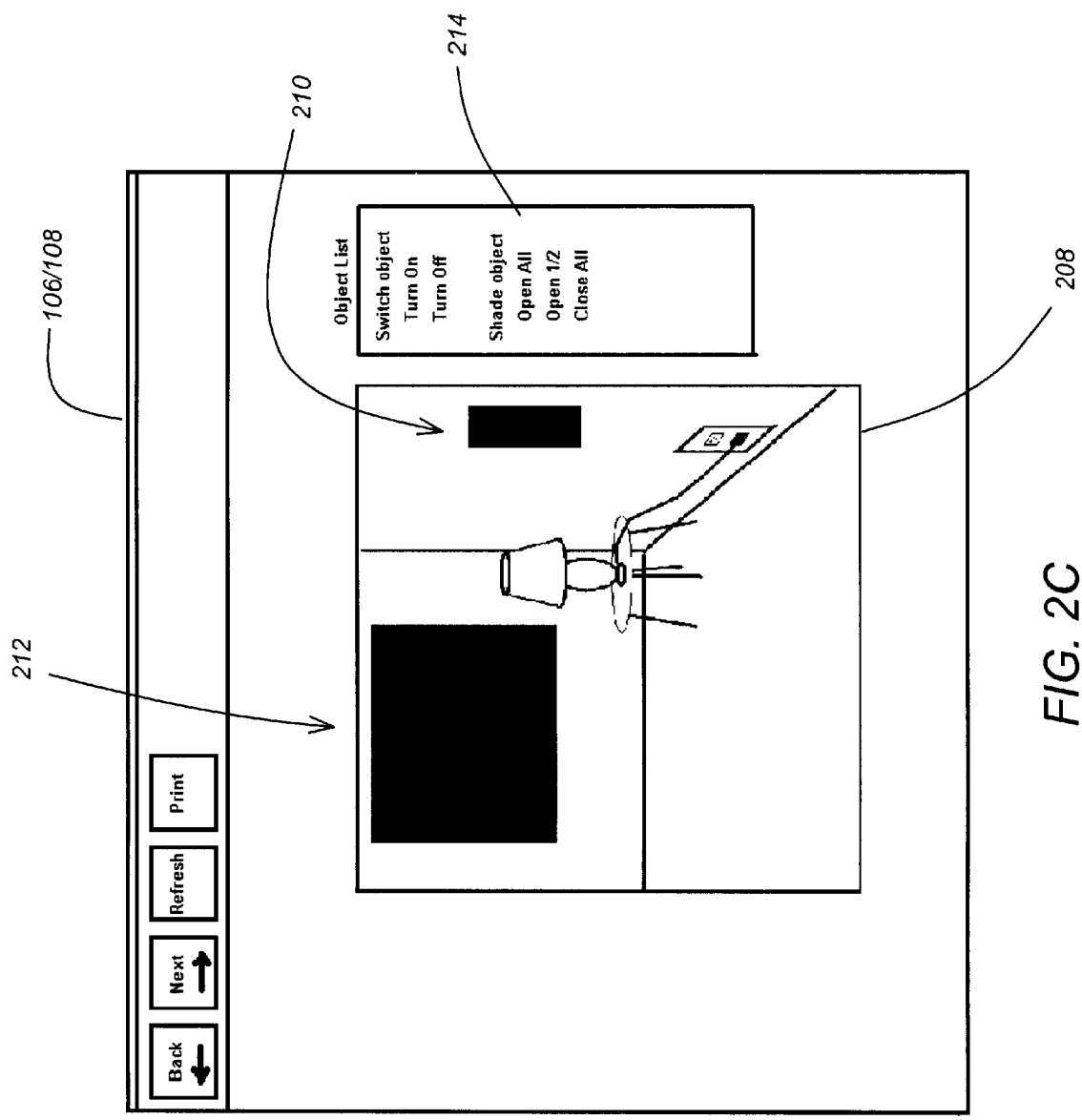

FIG. 2C shows an example of the initial system setup screen displayed by the Web browser 106 and the client coordinator 108. The initial system setup screen uses the live digital image 208 generated by the video camera 116. In this example, the live digital image 208 is displayed within the Web browser 106. The operator selects areas of the live digital image 208 to define "hot spots" 210 and 212, using a cursor control device. In the example of FIG. 2C, the hot spots 210 and 212 are visually identified by their solid fill color. Then, the operator may "right-click" on each of the hot spots 210 and 212 using the cursor control device, which results in the display of an command object list 214, wherein the command object list 214 identifies one or more command objects as well as a description of the control functions associated therewith. The operator associates a command object from the list 214 with a selected area 210 or 212 of the digital image 208 by double-clicking on the command object using the cursor control device.

Figure 2D:
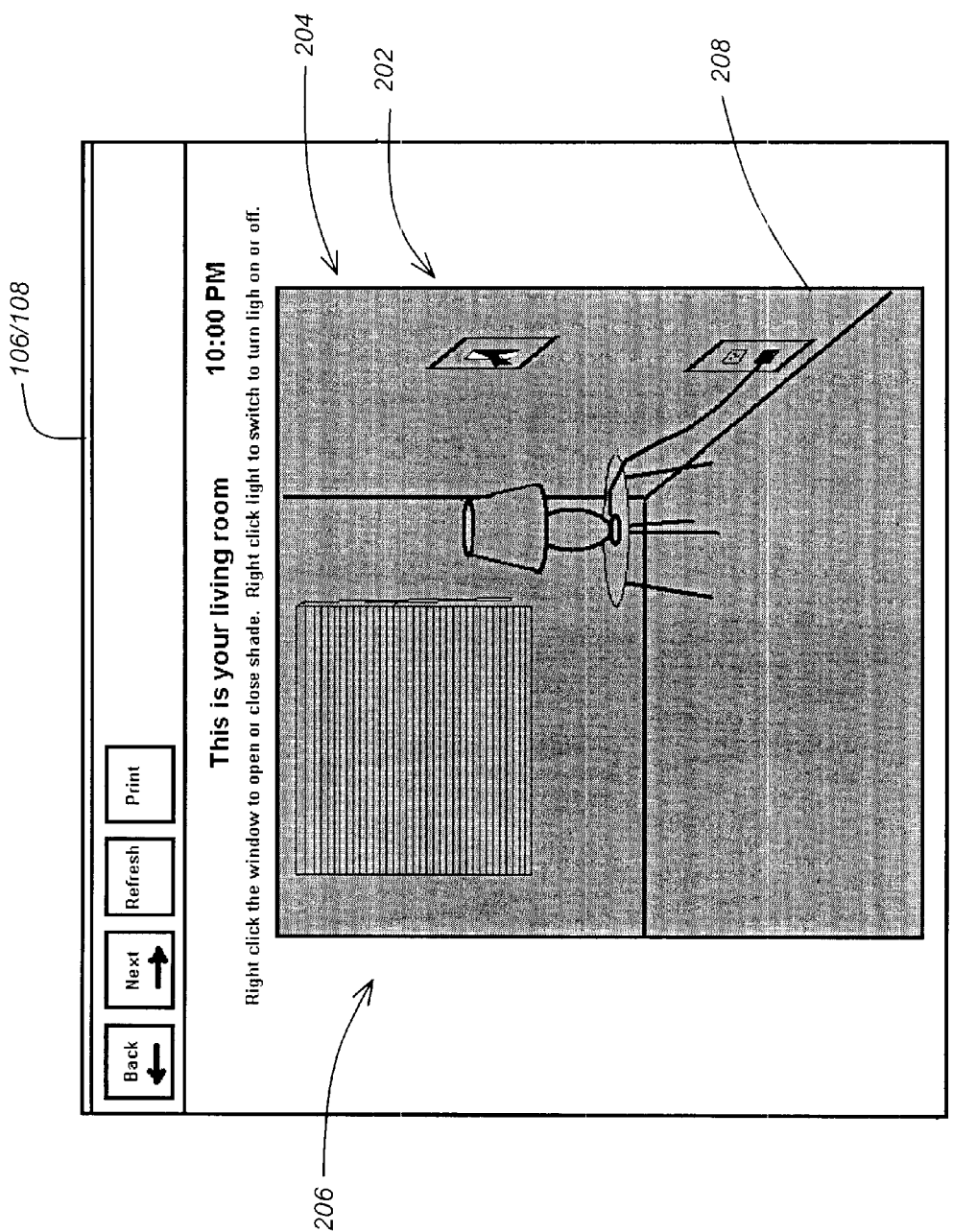

FIG. 2D shows an example of a first step in appliance control, after system setup has been completed. In this example, the live digital image 208 generated by the video camera 116 is displayed within the Web browser 106. Assume that this is the first view shown to an operator. Note that the light switch 202 and lamp 204 are "off" and the shades 206 are "closed".

Figure 2E:
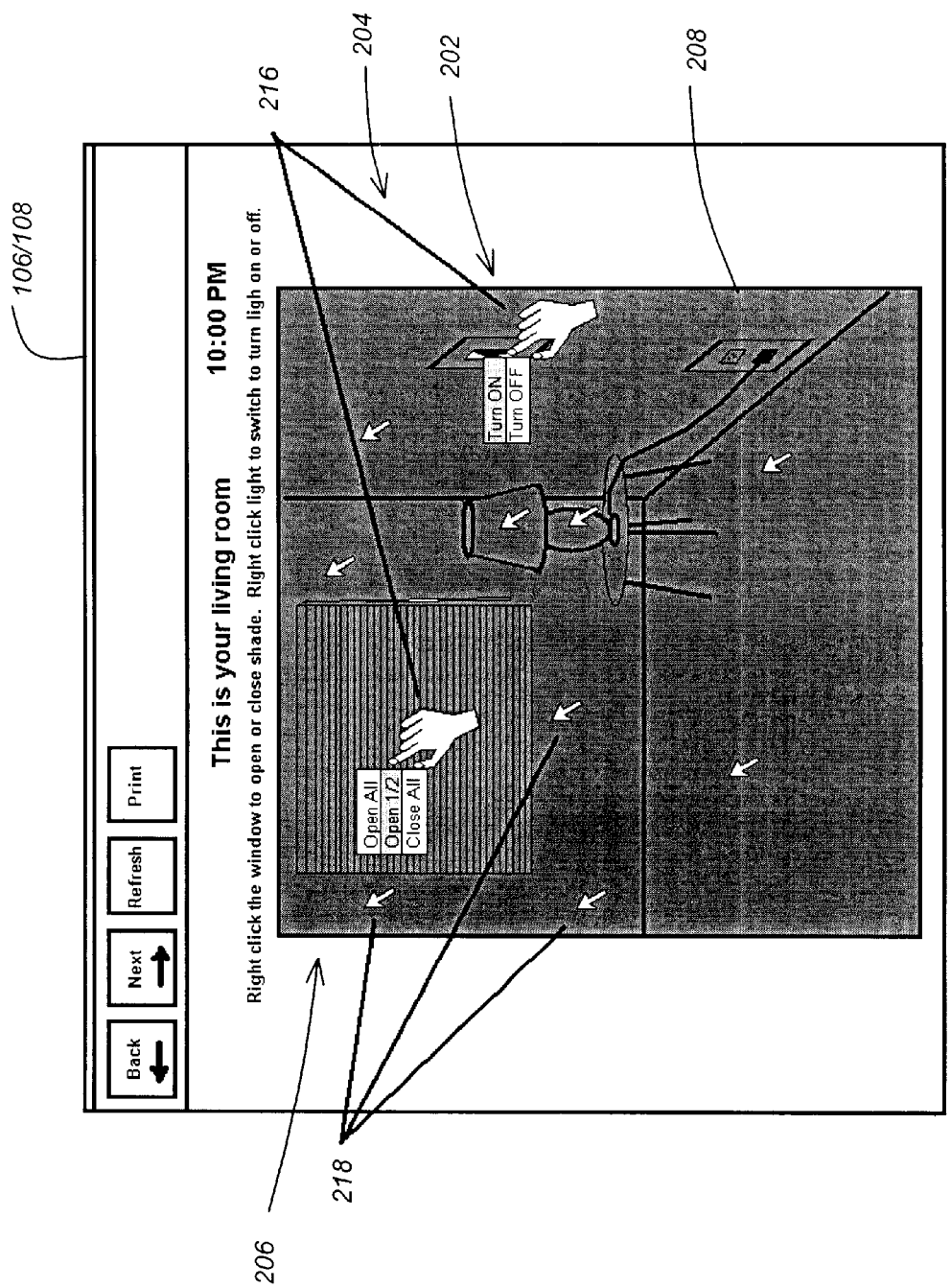

FIG. 2E is displayed after FIG. 2D, and shows a second step in appliance control. In this example, as the operator passes the cursor within the boundaries of a defined hot spot, such as the light switch 202 or the shades 206, a "hand" pointer and control menu 216 for the associated remote device 120 are displayed within the live digital image 208. Using the cursor control device, the operator may select one or more of the control functions from the control menu 216. The arrows 218 designate areas in the digital image 208 that do not have "hot spots."

Figure 2F:
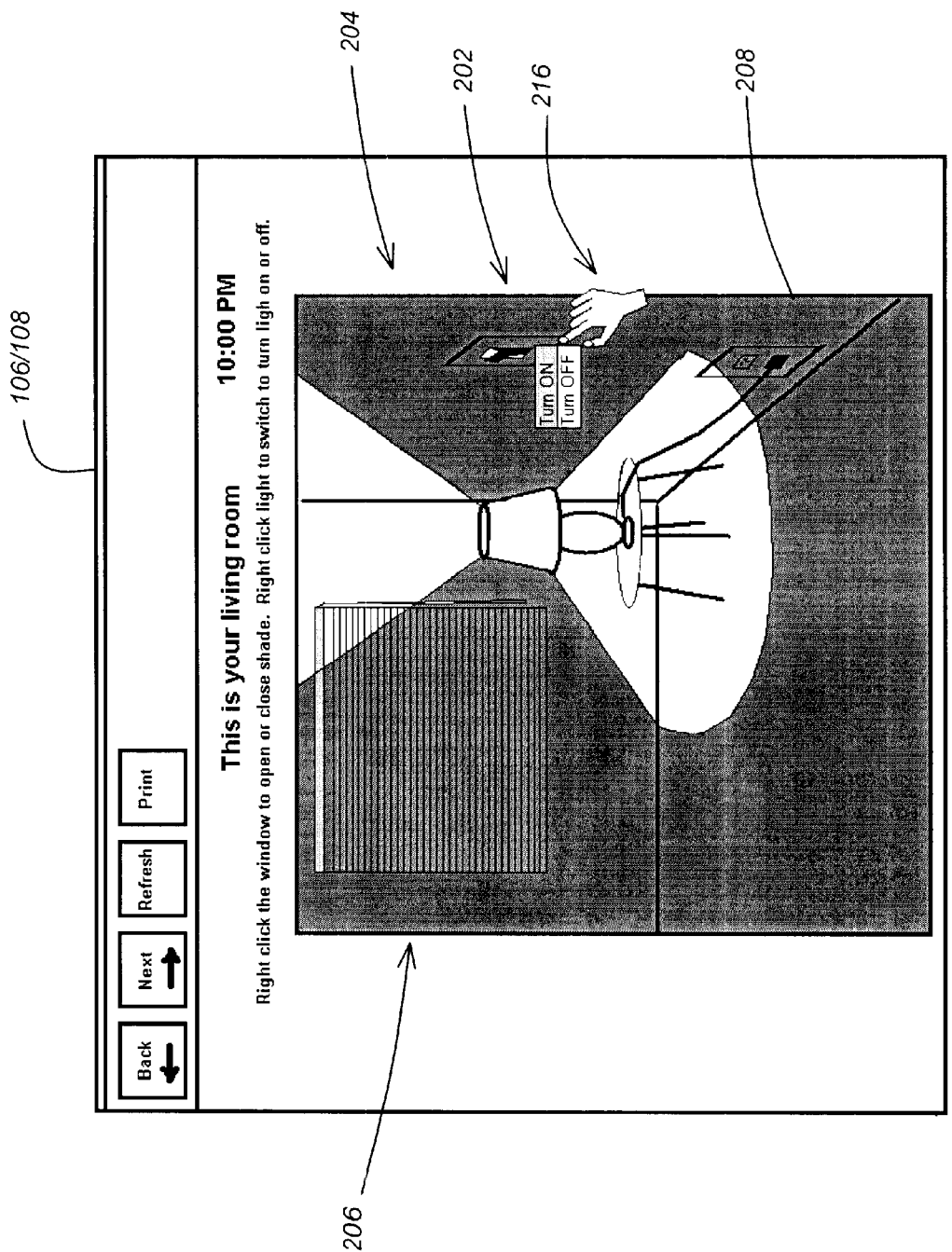

FIG. 2F is displayed after FIG. 2E, and shows a third step in appliance control. In this example, the operator has selected the "Turn On" choice in the control menu 216 associated with the light switch 202 and lamp 204. This selection is formulated into a request that is then transmitted from the Web browser 106 and client coordinator 108 to the Device Manager 118 of the device server 104, which effectuates the request, thereby turning on the lamp 204. The video camera 116 records and transmits back to the Web browser 106 a live digital image 208 that records the results of this action.

Figure 2G:
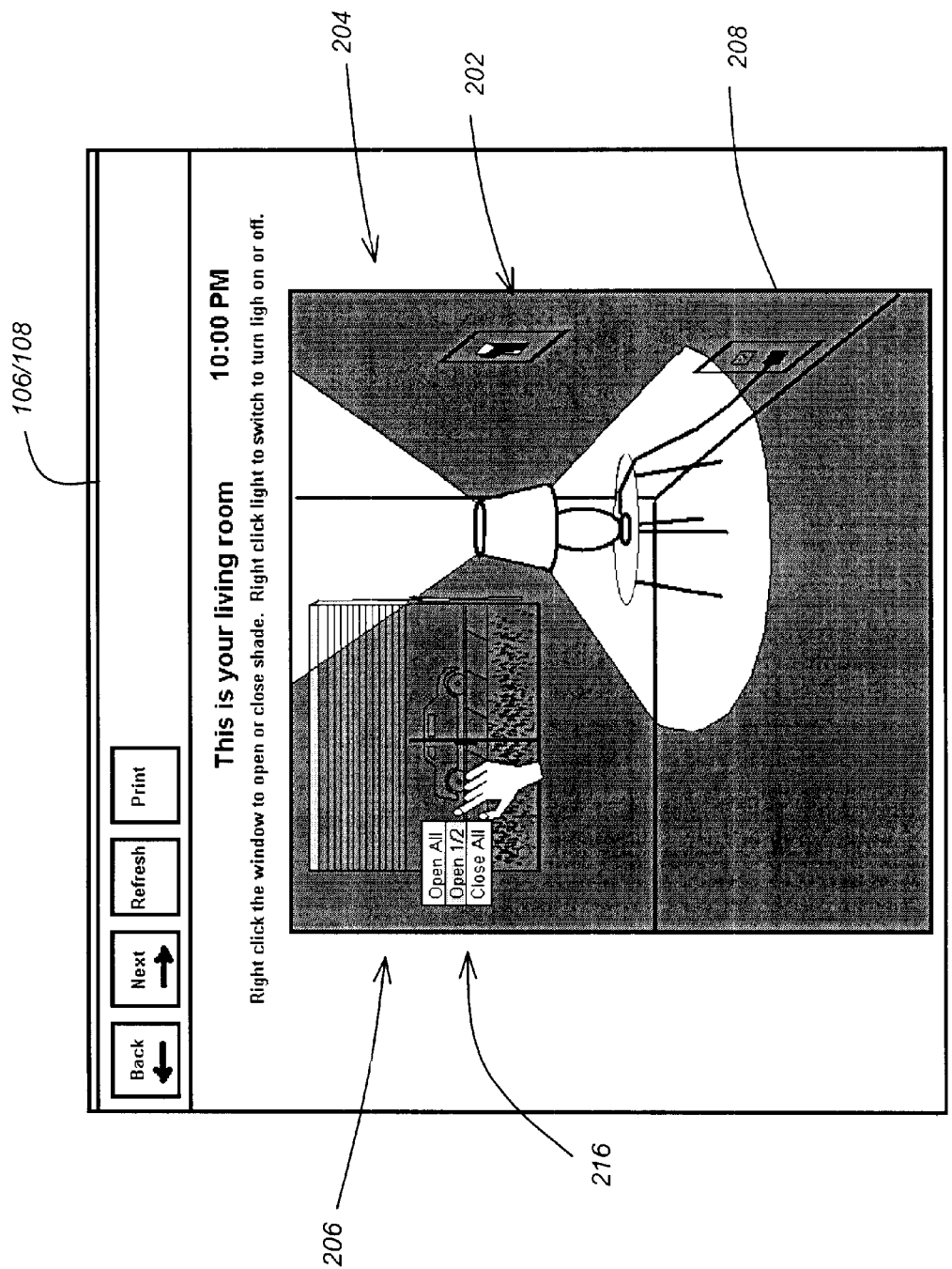

FIG. 2G is displayed after FIG. 2F, and shows a fourth step in appliance control. In this example, the operator has selected the "Open ½" choice in the control menu 216 associated with the shades 206. This selection is formulated into a request that is transmitted from the Web browser 106 and client coordinator 108 to the Device Manager 118 of the device server 104, which effectuates the request, thereby opening the shades 206 halfway. The video camera 116 records and transmits back to the Web browser 106 a live digital image 208 that records the results of this action.

Figure 2H:
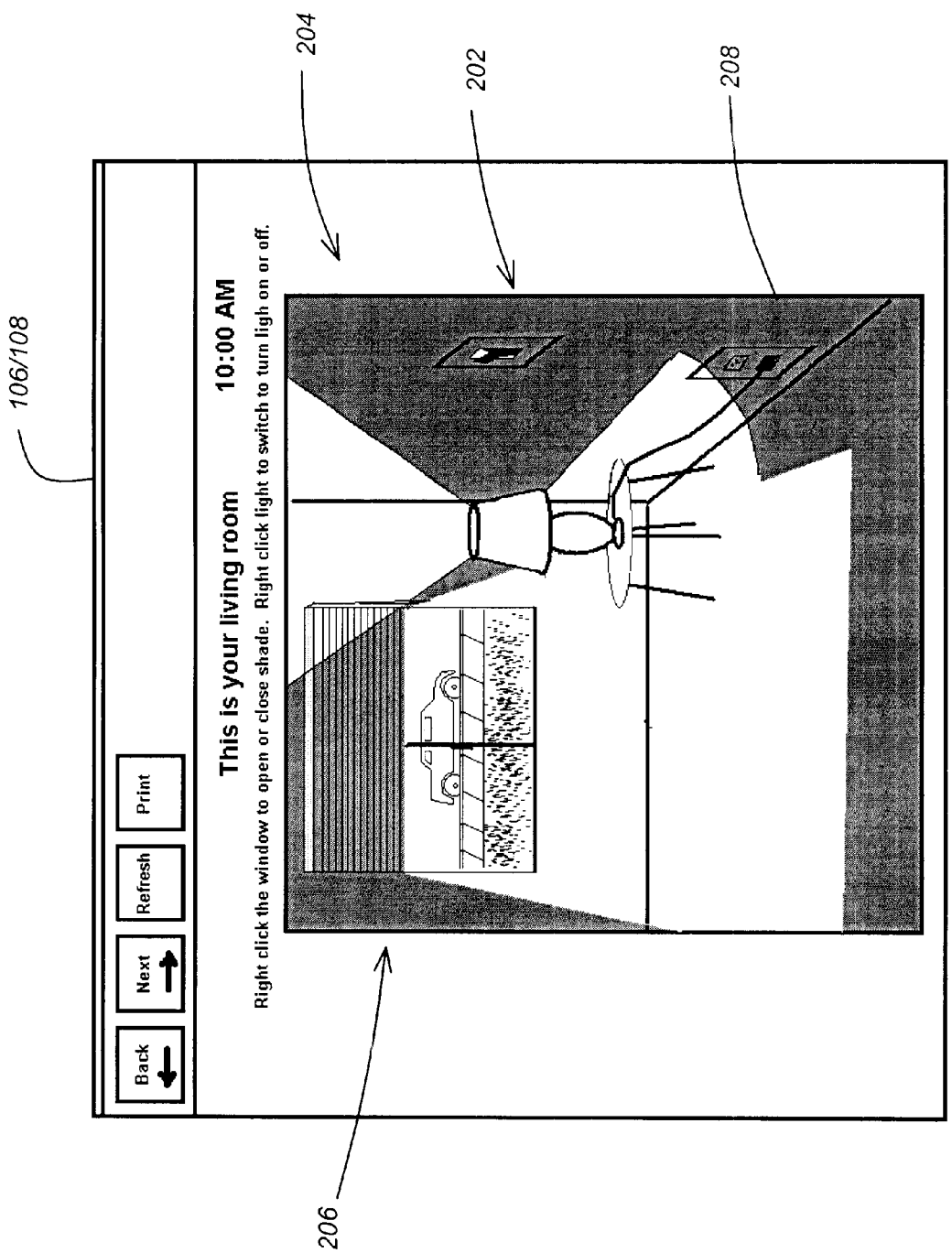

FIG. 2H is displayed after FIG. 2G, and shows a fifth step in appliance control. In this example, 12 hours have elapsed (from 10PM to 10AM), as indicated by the daylight outside the window shown in the live digital image 208 displayed within the Web browser 106, as well as the time displayed by the Web browser 106.

Figure 2I:
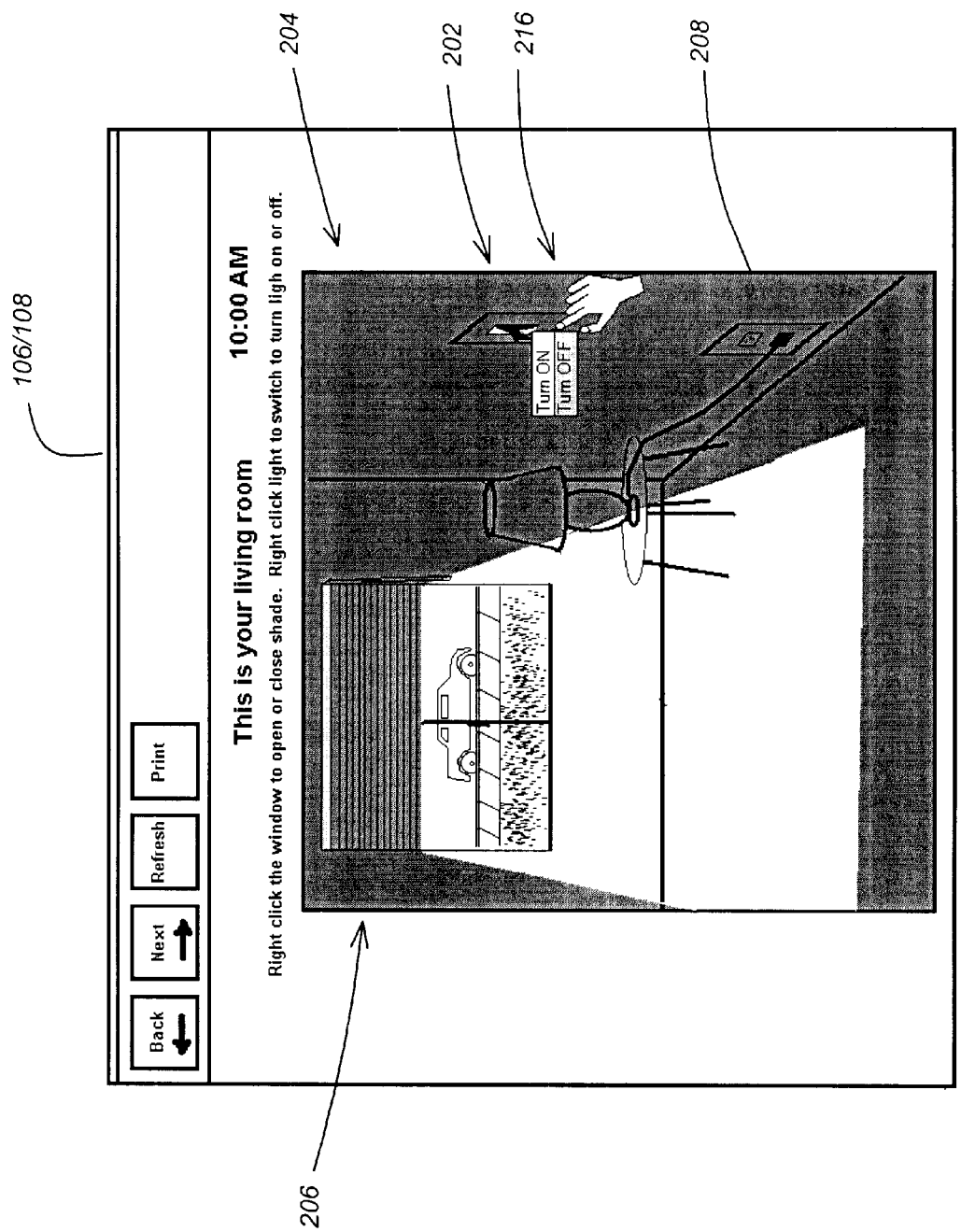

FIG. 2I is displayed after FIG. 2H, and shows a sixth step in appliance control. In this example, the operator has selected the "Turn Off" choice in the control menu 216 associated with the light switch 202 and lamp 204. This selection is formulated into a request that is transmitted from the Web browser 106 and client coordinator 108 to the Device Manager 118 of the device server 104, which effectuates the request, thereby turning off the lamp 204. The video camera 116 records and transmits back to the Web browser 106 a live digital image 208 that records the results of this action.

Figure 2J:
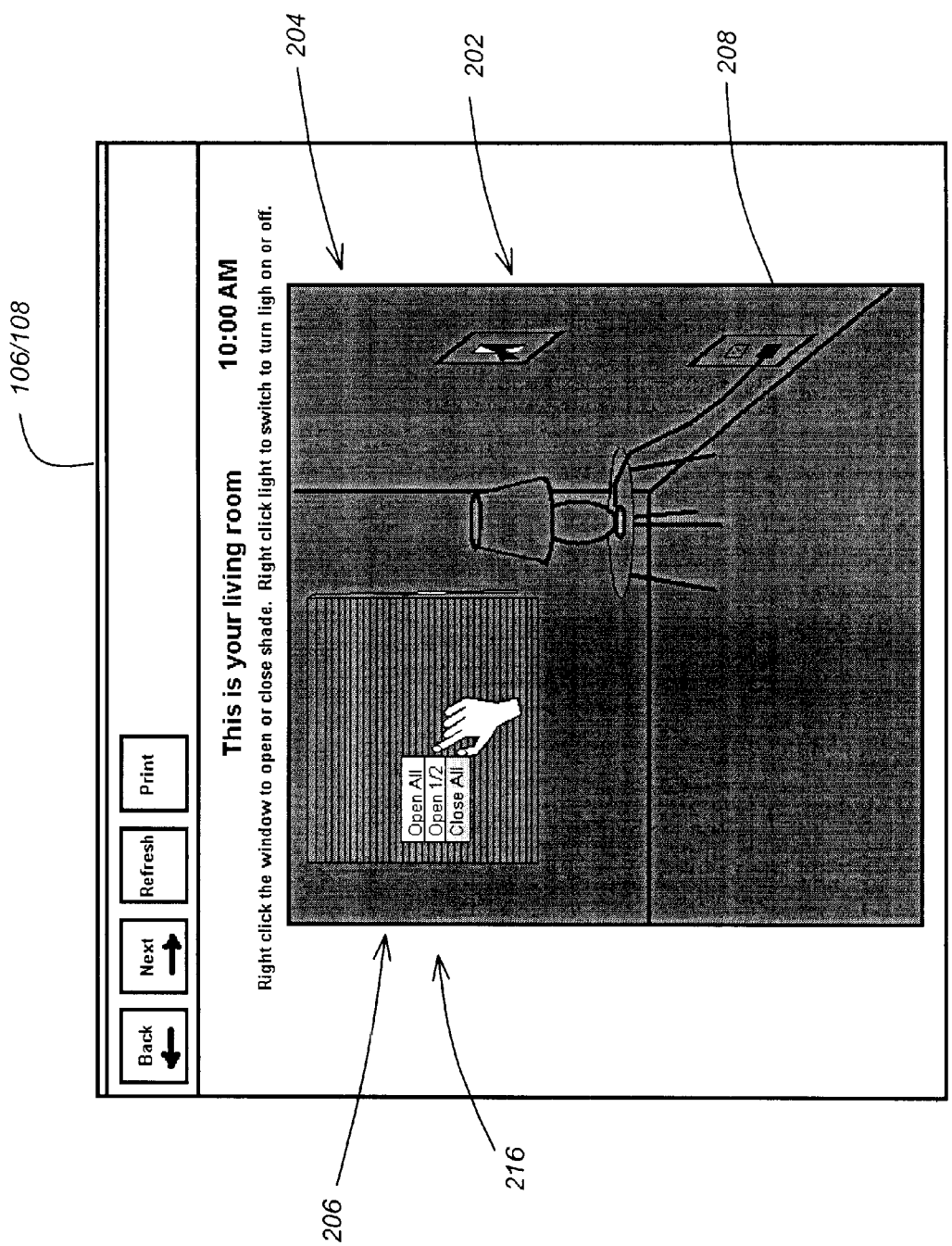

FIG. 2J is displayed after FIG. 2I, and shows a seventh step in appliance control. In this example, the operator has selected the "Close All" choice in the control menu 216 associated with the shades 206. This selection is formulated into a request that is transmitted from the Web browser 106 and client coordinator 108 to the Device Manager 118 of the device server 104, which effectuates the request, thereby closing the shades 206. The video camera 116 records and transmits back to the Web browser 106 a live digital image 208 that records the results of this action.

Logic of the Preferred Embodiment

Figure 3:
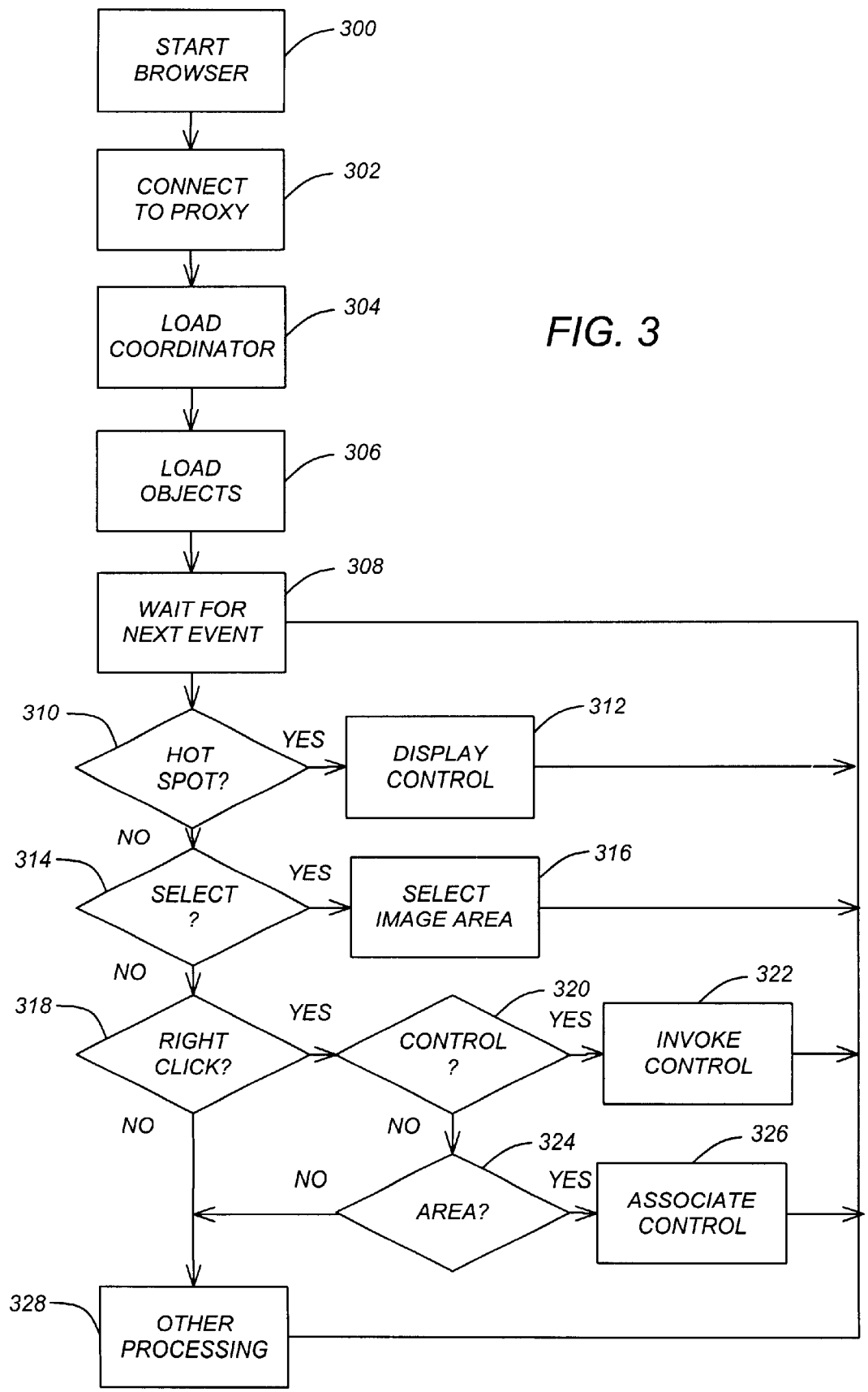
FIG. 3 is a flowchart that illustrates the general logic of the preferred embodiment of the present invention.

FIG. 3 is a flowchart that illustrates the general logic of the preferred embodiment of the present invention.

Block 300 represents the client computer 102 starting the Web browser 106.

Block 302 represents the Web browser 106 connecting to the Proxy Component 110 executed by the server computer 104.

Block 304 represents the Web browser 106 loading the client coordinator 108 from the Proxy Component 110 and then executing the client coordinator 108.

Block 306 represents the client coordinator 108 loading a list of command objects from the proxy component 110, wherein the command objects provide the control functions for the remote devices 120.

Thereafter, control transfers to Block 308, which waits for the next event to occur. Generally, these events may triggered either externally or internally. When an event occurs, control passes to Blocks 310–328 to identify the event and respond accordingly.

Block 310 is a decision block that represents the client coordinator 108 determining whether the event is the placement of a cursor on or near a "hot spot" previously defined on a live digital image displayed by the Web browser 106. If so, control transfers to Block 312; otherwise, control transfers to Block 314.

Block 312 represents the client coordinator 108 displaying one or more control function from the command object associated with the "hot spot."

Block 314 is a decision block that represents the client coordinator 108 determining whether the event is a "select" function for an area of a live digital image displayed by the Web browser 106. If so, control transfers to Block 316; otherwise, control transfers to Block 318.

Block 318 represents the client coordinator 108 selecting the area of the live digital image displayed by the Web browser 106, which may include a function of visually distinguishing the selected area as a "hot spot."

Block 320 is a decision block that represents the client coordinator 108 determining whether the event is a "right click" function for a cursor control device, or other input device for the client computer 102. If so, control transfers to Block 320; otherwise, control transfers to Block 328.

Block 320 is a decision block that represents the client coordinator 108 determining whether the "right click" event is a "select" function for a displayed control function from a command object associated with a "hot spot." If so, control transfers to Block 322; otherwise, control transfers to Block 324.

Block 322 represents the client coordinator 108 invoking the selected control function from the command object associated with the "hot spot." This invocation results in the control function being invoked, wherein the Web browser 106 and client coordinator 108 formulate a request for the device 120 associated with the "hot spot" and transmit that request to the server computer 104 for forwarding to the remote device 120 for execution.

Block 324 is a decision block that represents the client coordinator 108 determining whether the "right click" event is an "associate" function for a selected area from the live digital image displayed by the Web browser 106. If so, control transfers to Block 326; otherwise, control transfers to Block 328.

Block 326 represents the client coordinator 108 associating the selected area with a remote device 120 and a command object that provides the control functions for the device 120.

Finally, Block 328 represents the Web browser 106 and the client coordinator 108 performing other processing functions. Thereafter, control transfers to Block 308 to wait for the next event to occur.

Conclusion

This concludes the description of the preferred embodiment of the invention. The following describes some alternative embodiments for accomplishing the present invention. For example, any type of remote device could be used with the present invention. In addition, any type of hardware or software configuration and/or network configuration could benefit from the present invention.

In summary, the present invention discloses a method, apparatus, and article of manufacture for controlling a remote device from a client computer using a digital image of a remote location associated with the remote device. Using graphical user interface (GUI) provided by a client computer, the user select areas in the digital image for mapping to control functions for the remote device. These control functions are associated with command objects downloaded from a server computer and displayed on the graphical user interface. The control functions for the remote device can then be selected by moving a cursor over the selected areas of the digital image. When a control function is selected, the client computer formulates a request that the server computer and/or remote device can understand. Instantaneous feedback is provided by the digital image for any control functions that may be invoked by the user.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for controlling remote devices using a computer, comprising:

(a) displaying a digital image of a remote location associated with a remote device on a user interface of the computer;

(b) selecting at least one area in the displayed digital image, wherein the selected area is associated with the remote device;

(c) mapping the selected area to at least one control function for the remote device; and (d) invoking the control function for the remote device via the selected area.

2. The method of claim 1, wherein the digital image is a live digital image.

3. The method of claim 1, wherein the digital image is displayed by a Web browser.

4. The method of claim 1, wherein the computer is connected to a server that controls a remote camera for generating the digital image.

5. The method of claim 4, wherein the camera is positioned at the remote location with the remote device.

6. The method of claim 4, wherein the server controls the remote device.

7. The method of claim 1, wherein the selecting step comprises moving a cursor over the displayed digital image to designate the selected area.

8. The method of claim 1, wherein the selected area of the digital image defines a "hot spot".

9. The method of claim 8, wherein the "hot spot" is visually identified on the display.

10. The method of claim 1, wherein the mapping step comprises displaying a list of command objects representing a plurality of control functions for one or more remote devices and selecting at least one of the command objects from the list in order to associate at least one control function for a remote device with the selected area.

11. The method of claim 10, wherein the list of command objects is managed by a server connected to the computer that controls the remote device.

12. The method of claim 11, wherein the list of command objects is downloaded from the server to the computer.

13. The method of claim 1, wherein the invoking step comprises formulating a request into a command language for the remote device, and transmitting the request to a server computer managing the remote device.

14. The method of claim 1, further comprising displaying a response to the invoked command on the computer.

15. The method of claim 1, further comprising downloading a client coordinator to the computer from a server connected to the computer.

16. A system for controlling remote devices, comprising:
   (a) a computer; and
   (b) a graphical user interface (GUI), performed by the computer, for displaying a digital image of a remote location associated with a remote device for an operator, for accepting input from the operator selecting at least one area in the displayed digital image, wherein the selected area is associated with the remote device, for mapping the selected area to at least one control function for the remote device, and for accepting input from the operator invoking the control function for the remote device via the selected area.

17. The system of claim 16, wherein the digital image is a live digital image.

18. The system of claim 16, wherein the digital image is displayed by a Web browser.

19. The system of claim 16, wherein the computer is connected to a server that controls a remote camera for generating the digital image.

20. The system of claim 19, wherein the camera is positioned at the remote location with the remote device.

21. The system of claim 19, wherein the server controls the remote device.

22. The system of claim 16, wherein the means for selecting comprises means for moving a cursor over the displayed digital image to designate the selected area.

23. The system of claim 16, wherein the selected area of the digital image defines a "hot spot".

24. The system of claim 23, wherein the "hot spot" is visually identified on the display.

25. The system of claim 16, wherein the means for mapping comprises means for displaying a list of command objects representing a plurality of control functions for one or more remote devices and for selecting at least one of the command objects from the list in order to associate at least one control function for a remote device with the selected area.

26. The system of claim 25, wherein the list of command objects is managed by a server connected to the computer that controls the remote device.

27. The system of claim 26, wherein the list of command objects is downloaded from the server to the computer.

28. The system of claim 16, wherein the means for invoking comprises means for formulating a request into a command language for the remote device, and for transmitting the request to a server computer managing the remote device.

29. The system of claim 16, further comprising means for displaying a response to the invoked command on the computer.

30. The system of claim 16, further comprising means for downloading a client coordinator to the computer from a server connected to the computer.

31. An article of manufacture embodying logic for performing a method for controlling remote devices using a computer, the method comprising the steps of:
   (a) displaying a digital image of a remote location associated with a remote device on a user interface of the computer;
   (b) selecting at least one area in the displayed digital image, wherein the selected area is associated with the remote device;
   (c) mapping the selected area to at least one control function for the remote device; and
   (d) invoking the control function for the remote device via the selected area.

32. The method of claim 31, wherein the digital image is a live digital image.

33. The method of claim 31, wherein the digital image is displayed by a Web browser.

34. The method of claim 31, wherein the computer is connected to a server that controls a remote camera for generating the digital image.

35. The method of claim 34, wherein the camera is positioned at the remote location with the remote device.

36. The method of claim 34, wherein the server controls the remote device.

37. The method of claim 31, wherein the selecting step comprises moving a cursor over the displayed digital image to designate the selected area.

38. The method of claim 31, wherein the selected area of the digital image defines a "hot spot".

39. The method of claim 38, wherein the "hot spot" is visually identified on the display.

40. The method of claim 31, wherein the mapping step comprises displaying a list of command objects representing a plurality of control functions for one or more remote devices and selecting at least one of the command objects from the list in order to associate at least one control function for a remote device with the selected area.

41. The method of claim 40, wherein the list of command objects is managed by a server connected to the computer that controls the remote device.

42. The method of claim 41, wherein the list of command objects is downloaded from the server to the computer.

43. The method of claim 31, wherein the invoking step comprises formulating a request into a command language for the remote device, and transmitting the request to a server computer managing the remote device.

44. The method of claim 31, further comprising displaying a response to the invoked command on the computer.

45. The method of claim 31, further comprising downloading a client coordinator to the computer from a server connected to the computer.

* * * * *